United States Patent [19]

Coombes, Jr. et al.

[11] Patent Number: 5,234,260

[45] Date of Patent: Aug. 10, 1993

[54] HUBCAP ASSEMBLY

[75] Inventors: Robert L. Coombes, Jr., La Canada-Flintridge; Terence C. Colwell, West Covina, both of Calif.

[73] Assignee: Crown City Plating Co., El Monte, Calif.

[21] Appl. No.: 616,659

[22] Filed: Nov. 20, 1990

[51] Int. Cl.$^5$ .............................................. B60B 7/06
[52] U.S. Cl. ................................ 301/108.1; 301/37.1; 301/37.37; 301/37.38
[58] Field of Search ............... 301/37 R, 37 P, 37 S, 301/37 SS, 37 SC, 108 R, 108 A, 108 S, 108 SC

[56] References Cited

U.S. PATENT DOCUMENTS

| | | | |
|---|---|---|---|
| 2,626,838 | 1/1953 | Lyon | 301/37 S |
| 4,067,621 | 1/1978 | Reppert | 301/108 A |
| 4,083,606 | 4/1978 | Scruggs | 301/37 SC X |
| 4,241,954 | 12/1980 | Brown | 301/37 R X |
| 4,447,091 | 5/1984 | Nguyen et al. | 301/37 SC X |
| 4,699,434 | 10/1987 | Hempelmann | 301/37 SS |

Primary Examiner—Russell D. Stormer
Attorney, Agent, or Firm—Christie, Parker & Hale

[57] ABSTRACT

A plastic hubcap assembly comprises an annular anchor adapted to be fixedly mounted on the outer surface of an automobile wheel. A retaining ring is rotatably mounted on the anchor and secured by a releasable latch mechanism which prevents loosening of the retaining ring. A decorative cover, preferably made of a platable plastic, is fixedly mounted over the retaining ring.

26 Claims, 11 Drawing Sheets

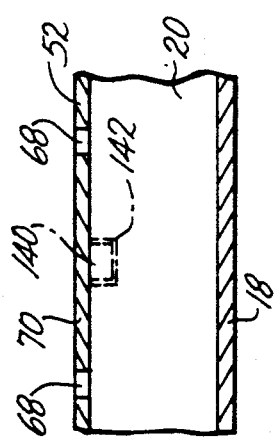
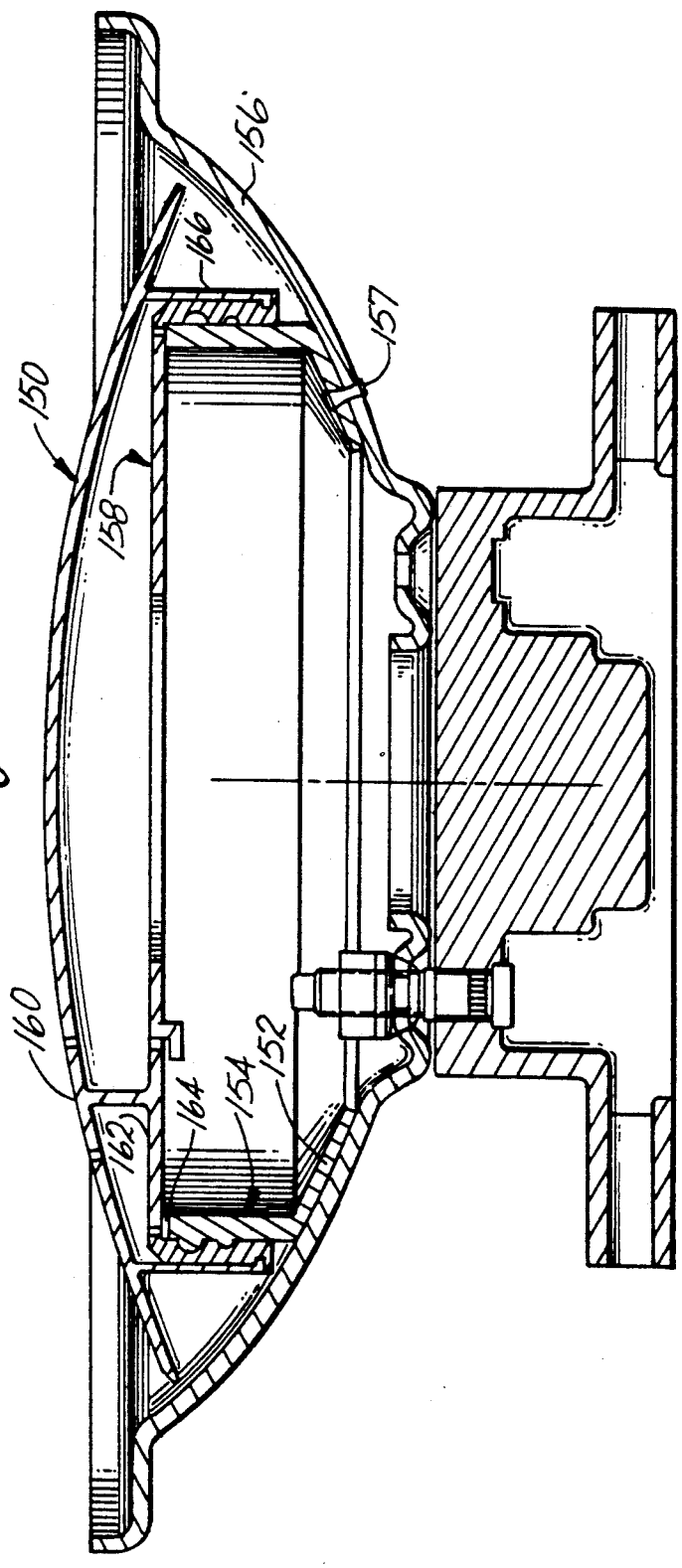

HUBCAP ASSEMBLY

FIELD OF THE INVENTION

This invention relates generally to the field of automotive hubcaps and, more particularly, to a decorative, platable, plastic hubcap assembly.

BACKGROUND OF THE INVENTION

Automotive hubcaps are typically decorative coverings which are secured to the outside of a wheel after the wheel has been mounted on a car. Depending on the style of the hubcap, it may cover from a small center portion of the wheel to most of the exterior surface of the wheel.

Traditionally, hubcaps have been made of metal. However, there is an increasing desire to manufacture hubcaps out of plastic. Plastic hubcaps are lightweight, easy to manufacture by injection molding and generally less expensive than metal hubcaps. For a decorative finish, the plastic hubcap may be made of a platable or colored plastic as desired.

Hubcaps are secured to the wheel by a variety of means, all of which must allow the hubcap to be easily removed. This is required to allow access to the lug nuts for removal of the wheel, e.g. to change or repair a tire, for brake repair, etc. One type of hubcap is secured to the wheel by spring clips located at about the periphery of the hubcap. While such hubcaps are easily installed and removed, they are also easily loosened and knocked off during driving. Due to the spring force required, this type of hubcap is generally not made out of plastic.

Another type of hubcap, which can be made out of plastic, is secured to the wheel by screws or the like. Often, the screws extend into threaded holes in the wheel or into metal clips which are attached to the wheel. In such an arrangement, misalignment of the screws and screw holes and/or clips during assembly result in hubcaps not adequately secured to the wheel. Moreover, the screws cannot be tightened so tight that the plastic of the hubcap cracks or that the hubcaps are not easily removed. Even with metal hubcaps, the screws must be easily removed to allow removal of the hubcap. This often results in the screws loosening during driving which, in turn, results in the hubcaps falling off or becoming misaligned and being damaged. Screws which are sufficiently tight are often difficult to unscrew. This situation is often aggravated if the screw head is damaged, by the use of an improper size screwdriver.

It is apparent that there is a need for a system to secure hubcaps to automotive wheels so that the hubcap will not loosen and fall off during use, yet to allow the hubcap to be easily removed when desired.

SUMMARY OF THE INVENTION

This invention provides a hubcap assembly comprising a generally annular anchor which is fixedly attachable to an automotive wheel, a decorative cover adapted to fit over the anchor and means for removably securing the cover to the anchor.

Preferred means for removably securing the cover to the anchor comprises interengaging members on the anchor and cover for rotatably mounting the cover to the anchor and a releasable latch means for releasably preventing rotational movement of the cover relative to the anchor once the cover is mounted on the anchor.

A particularly preferred means for removably securing the cover to the anchor comprises a retaining ring having one or more interengaging members which rotatably engage corresponding interengaging members on the anchor. Means are provided for releasably preventing rotational movement of the retaining ring relative to the anchor once the retaining ring is mounted on the anchor. Means are also provided for securing the cover to the retaining ring once the retaining ring has been mounted on the anchor.

In a preferred embodiment of the invention, the anchor comprises a generally flat, annular base and a generally cylindrical side wall extending upwardly along the outer periphery of the base. A retaining ring is adapted to fit over the anchor and comprises a top wall and a generally cylindrical side wall extending downwardly from the top wall. The anchor side wall and retaining ring side wall comprise interengaging members, such as threads or the like, so that the retaining ring can be rotatably mounted onto the anchor. Releasable latch means are provided to prevent rotation of the retaining ring relative to the anchor and, hence, unwanted loosening of the retaining ring. Means are also provided for securing the cover to the retaining ring.

A preferred latch means comprises one or more serrations on the anchor side wall which engage corresponding serrations on the side or top wall of the retaining ring. When engaged, the serrations prevent rotational movement of the retaining ring relative to the anchor. The latch means further comprises means for disengaging the interengaging serrations.

In a particularly preferred embodiment, the anchor comprises serrations which extend upwardly from the top of the anchor side wall. The serrations of the anchor engage corresponding serrations of the retaining ring which extend downwardly from one end of a pivot plate located in the retaining ring top wall. The pivot plate comprise hinge means arranged so that depressing of one end of the pivot plate results in the raising of the opposite end. In this manner, depressing the end of the pivot plate opposite the serrations results in the raising and disengaging of those serrations from the serrations on the top of the anchor side wall.

BRIEF DESCRIPTION OF THE DRAWINGS

These and other features and advantages of the present invention will be better understood by reference to the following detailed description when considered in conjunction with the accompanying drawings wherein:

FIG. 4a is a cross sectional view of the preferred releasable locking mechanism;

FIG. 15 is a cross sectional view of another suitable releasable locking mechanism; and FIG. 16 is a cross-sectional view of another preferred hubcap assembly.

DETAILED DESCRIPTION

Figure 1:
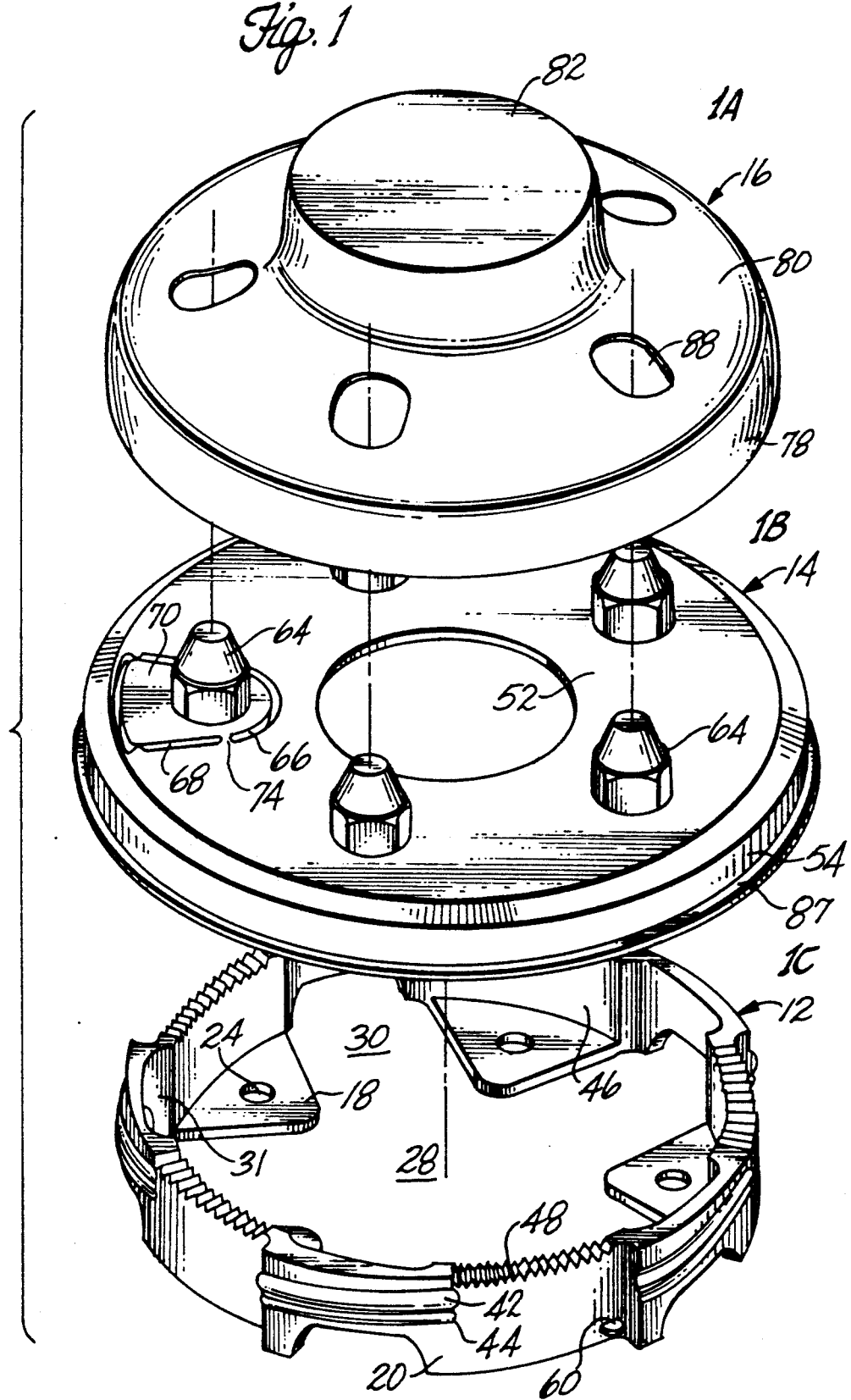
FIG. 1 is an exploded perspective view of a preferred hubcap assembly construction in accordance with the present invention.

With reference to FIGS. 1-7, there is shown a particularly preferred hubcap assembly 10 constructed in accordance with the present invention. The hubcap assembly comprises an anchor 12, a retaining ring 14 and a cover 16.

The anchor 12 comprises a flat, annular base 18 and a generally cylindrical side wall 20 which extends upwardly about the outer circumference of the base 18. The side wall 20 comprises a top surface and inner and outer side surfaces. The anchor 12 is fixedly mounted by rivets 22 which extend through holes 24 in the base 18 to the outer face of a wheel 26. It is apparent that, rather than rivets, screws, bolts or other suitable means of attachment may be used.

The base 18 of the anchor 12 comprises a central opening 28 at least as large as an inner diameter of the wheel 26. The base 18 further comprises a plurality of pockets 30 at positions corresponding to the holes in the wheel 26 through which studs 32 of the rotor 34 extend. The pockets 30 are preferably large enough to allow conventional lug nuts 36 to be tightened directly against the wheel 26 to secure the wheel to the rotor.

In the embodiment shown, the side wall 20 of the anchor 12 is cut-away to form recesses 31 which extend the pockets 30. This provides additional clearance for the lug nuts 36 and the tools required to install and remove the lug nuts 36. Depending on the arrangement of the studs 32 and the outer diameter of the anchor 12, such additional clearance may not be required. It is desired, however, that the base be configured so that there be no need to remove the anchor 12 from the wheel 26 to enable the wheel to be removed from the car.

Figure 3:
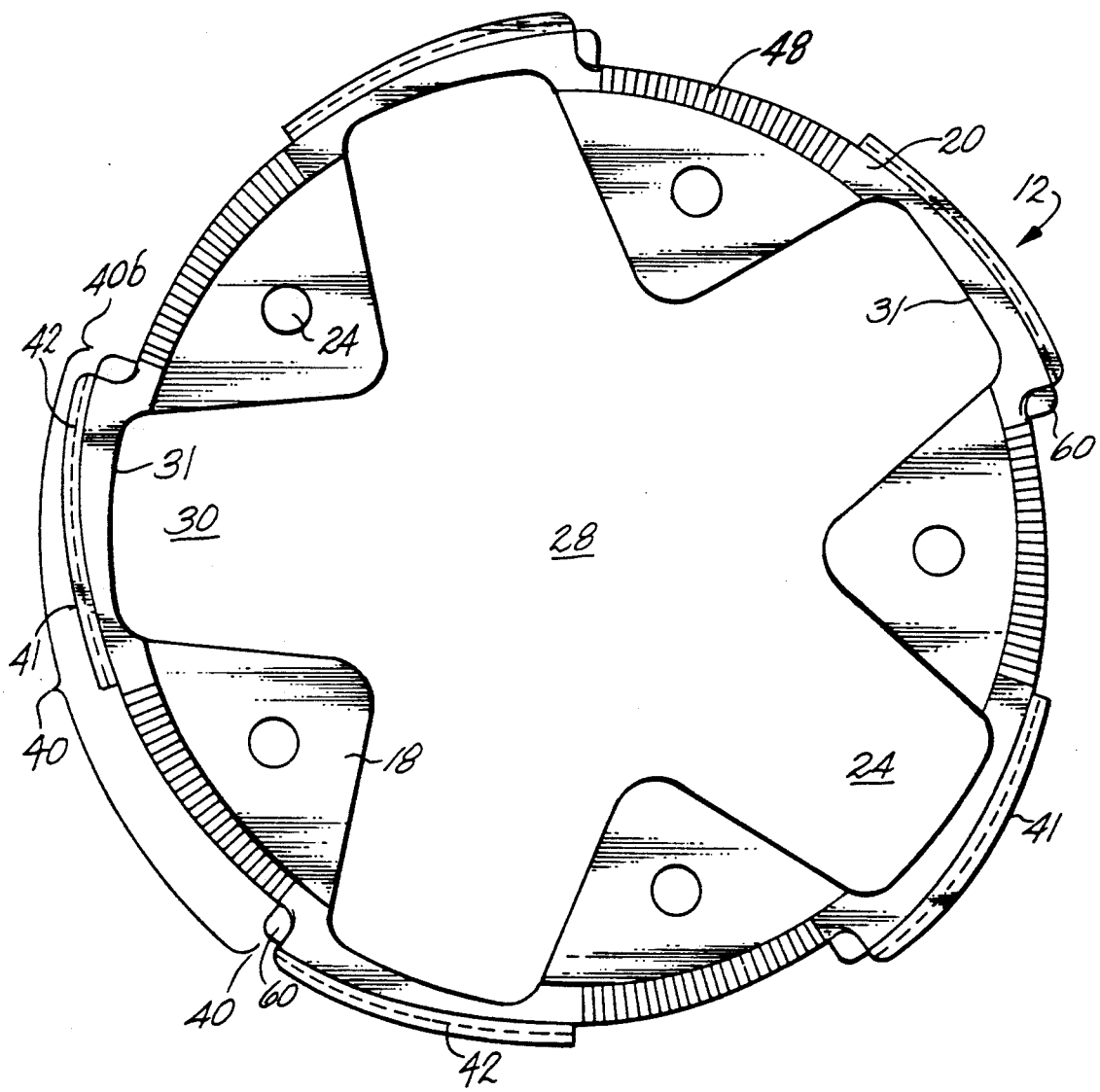
FIG. 3 is a top view of the anchor shown in FIGS. 1 and 2.

It is understood that the configuration of the anchor 12 may vary. For example, the number, size and location of the pockets 30 may vary according to the number and location of studs 32 required to mount the wheel on the car. Rather than pockets, as shown in FIG. 3, holes or openings in the base 18 may be used. Likewise, the number and location of holes 24 in the base 18 for securing the base to the wheel may vary as desired.

The anchor side wall 20 comprises a plurality of side wall sections 40 of generally equal length. The outer surface of each section 40 forms a "mating" surface 41. The "mating" surface may have a "spiral" arc, i.e. a non-circular arc of increasing diameter as in a spiral or an "offset cylindrical" arc, i.e. a cylindrical arc in which the axis of the cylinder is offset from the central axis of the anchor. If desired, the mating surface may taper inwardly as in a cone. Because the inner side surface of the anchor side wall 20 is generally cylindrical (except for recesses 31), the thickness of the side wall increases from one end 40a of each section 40 to the opposite end 40b. In the embodiment shown, there are five side wall sections 40. It is understood that the number of such sections may vary as desired.

Figure 2:
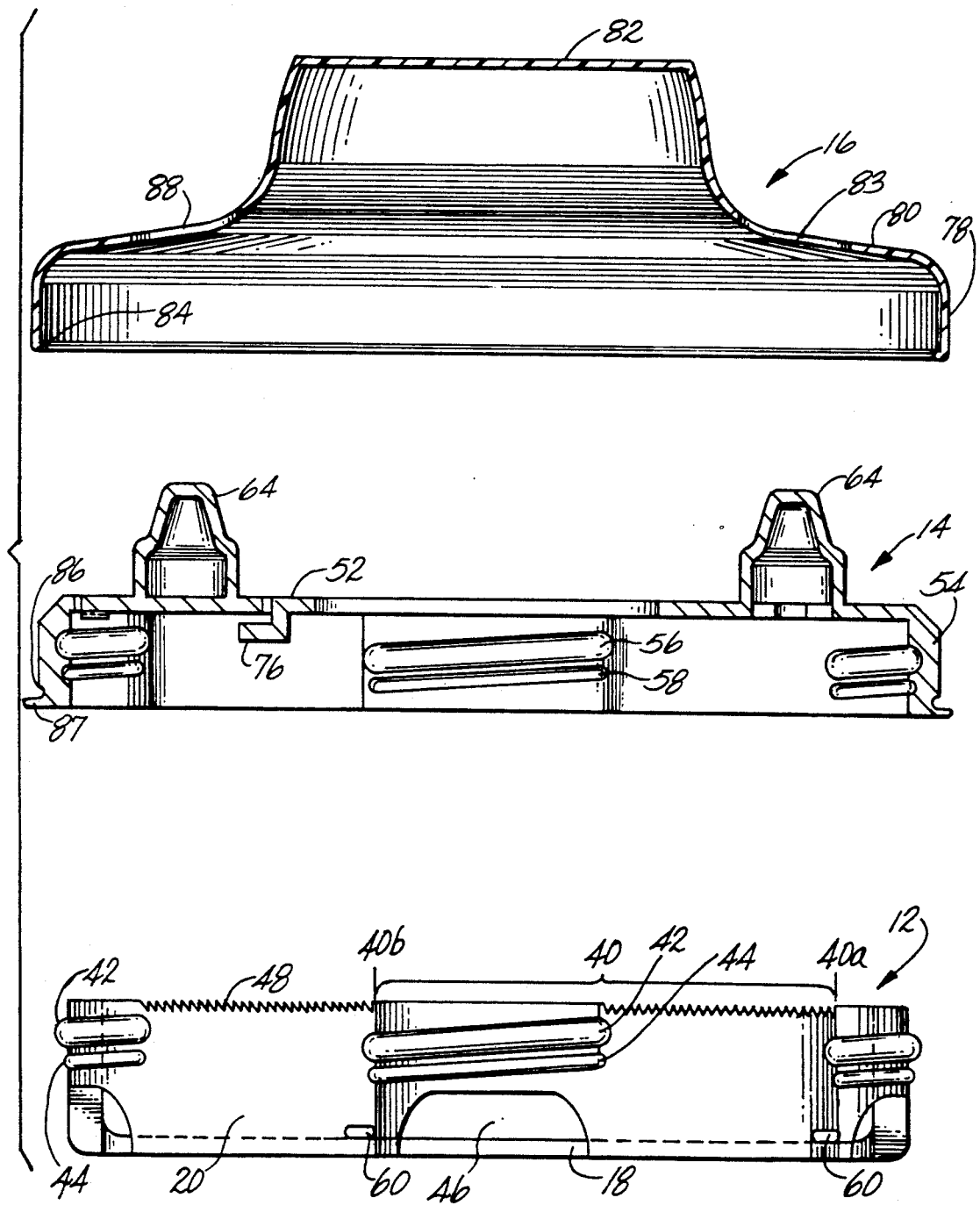
FIG. 2 is an exploded side view of the hub cap assembly of FIG. 1 wherein the retaining ring and cover are in cross-section.

Each side wall section 40 comprises a set of ribs which rotatably engage a corresponding set of slots in the retaining ring 14. In the embodiment shown, each set of ribs comprises an upper rib 42 and a lower rib 44, each having a generally semi-circular cross section. The width of the upper rib 42 is larger than the width of the lower rib 44. As shown in FIG. 2, the ribs 42 and 44 extend at a slight upward angle from the end 40b of the side wall section 40 of largest thickness to about the midpoint of the side wall section 40. The arc traveled by the ribs 42 and 44 is generally that of a conical helix.

A stop 60 is provided just before and below the lower rib 44. The stop assumes proper alignment of the ribs of the anchor with the slots of the retaining ring. Each side wall section 40 also comprises a window 46 at the base of the side wall between adjacent sets of ribs. The windows 46 help to increase the flexibility of the anchor side wall 20 and also reduce the cost of materials required to manufacture the anchor.

The top surface of the side wall 20 comprises five sets of saw-tooth serrations 48 symmetrically located about the top side wall surface. Each set of serrations 48 is located generally above an opening 46 and extends from about the end 40a of the side wall section 40 of smallest thickness to about the mid point of the side wall 20. One set of serrations 48 engages corresponding serrations in the retaining ring 14 when the retaining ring 14 is mounted on the anchor 12. Accordingly, it is apparent that the number and location of the serrations 48 may vary, as desired, so long as there is at least one set of serrations provided to engage the corresponding serrations of the retaining ring.

The retaining ring 14 comprises a generally flat, annular top wall 52 having top and bottom surfaces and a generally cylindrical side wall 54 which extends downwardly from the outer circumferential edge of the top wall 52. The side wall 54 comprises inner and outer side surfaces and a bottom surface.

Figure 4:
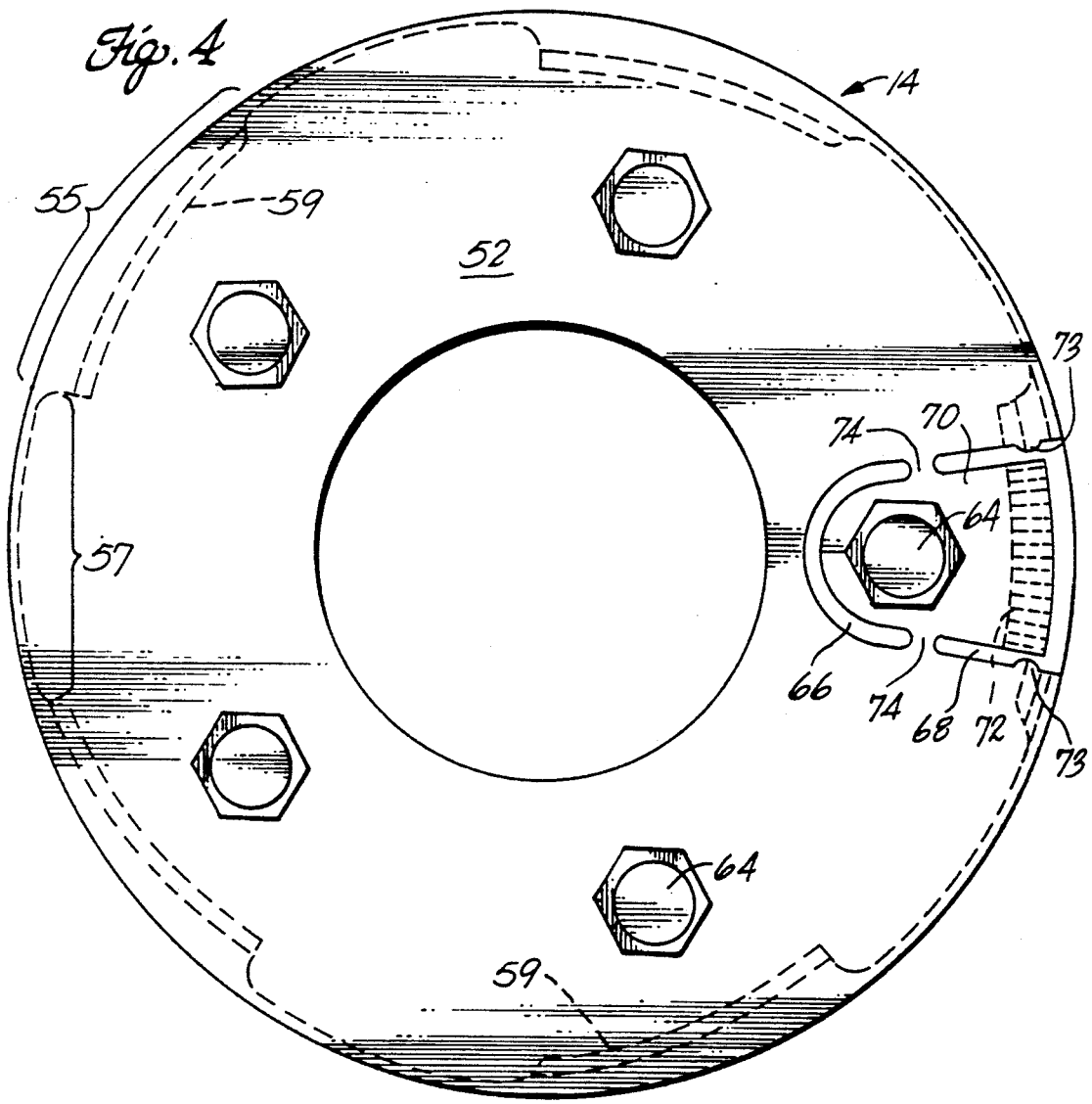
FIG. 4 is a top view of the retaining ring shown in FIGS. 1 and 2.

The outer side wall surface is generally circular. The inner side wall surface has a configuration, as shown in FIG. 4, which provides five sections of greater thickness 55 separated by five recesses or sections of lesser thickness 57. In the sections of greater thickness 55, the inner surface forms a "mating" surface 59, which, as in the mating surface of the anchor side wall, has a "spiral" arc or an "offset cylindrical" arc. In the recesses 57, i.e. of lesser thickness, the inner surface forms a circular arc, thereby providing uniform thickness throughout those sections.

Figure 6:
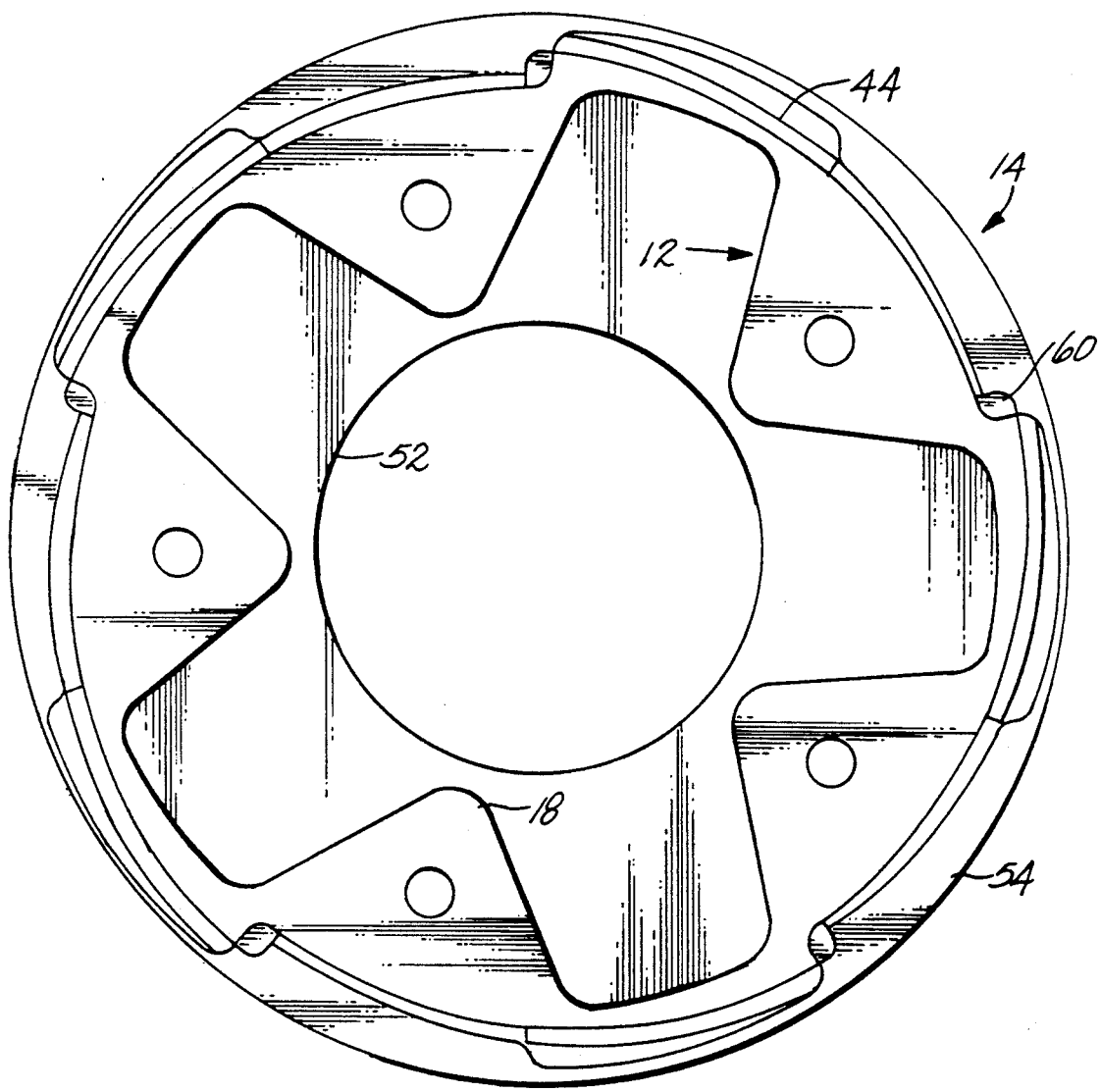
FIG. 6 is a bottom view of the retaining ring initially fitted over the anchor.
Figure 7:
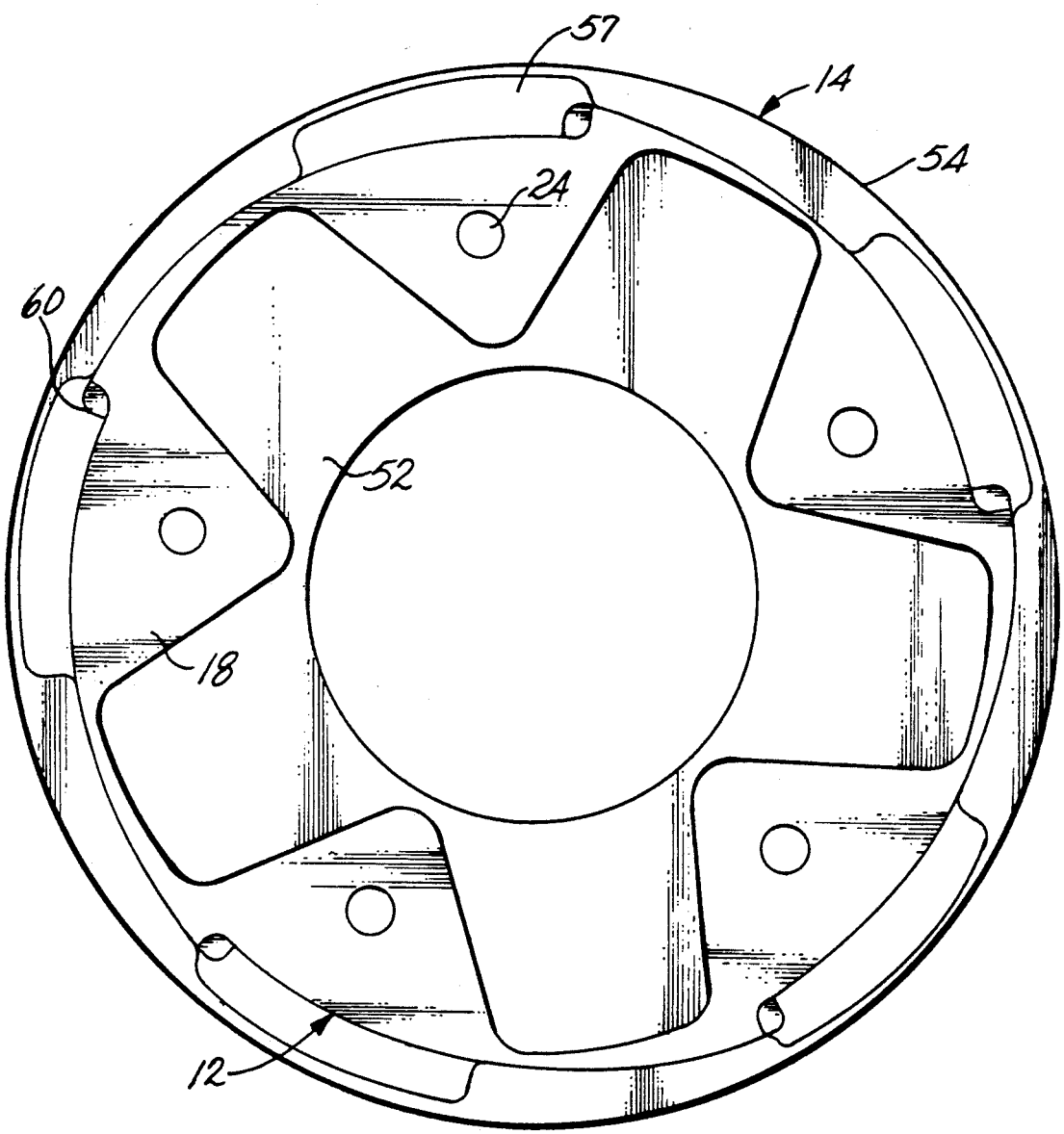
FIG. 7 is a bottom view of the retaining ring fitted over and tightened on the anchor.

In the areas of greater thickness 55 the inner surface of the side wall 54 comprises five sets of slots 56 and 58 which receive the corresponding ribs 42 and 44 respectively of the anchor side wall 30. The upper slot 56 is larger than the lower slot 58 just as the upper rib 42 of the anchor 12 is larger than the lower rib 44. This arrangement presents misalignment during mounting by preventing the lower slot 58 from receiving the upper rib 42. In the above arrangement, to mount the retaining ring 14 on the anchor 12, the retaining ring 14 is first fitted over the anchor 12 with the ribs positioned in the recesses 57 of the retaining ring as shown in FIG. 6. The bottom surface of the retaining ring 14 engages Stops 60 and aligns the leading ends of the ribs with the front ends of the slots. The retaining ring 14 is then rotated clockwise until tight, with the spiral surfaces 41 of the anchor side wall 20 engaging the spiral surfaces 59 of the retaining ring side wall 54. As shown in FIG. 7, this secures the retaining ring 14 onto the anchor 12.

It is understood that the number, size, location and configuration of the ribs and slots may vary as desired. For example, a single large rib which fits into a single large slot may be used. If desired, the ribs may be located on the retaining ring and the slots in the anchor. Moreover, that any means for rotatably engaging the anchor 12 and retaining ring 14 may be used. For example, rather than the rib and slot arrangement mentioned above, the anchor 12 and retaining ring 14 may have interengaging threads. Alternatively, one of the anchor and retaining rings may have one or more pins which engage corresponding grooves or slots in the other of the anchor or retaining ring.

It is presently preferred that the side walls of the anchor and retaining ring have a plurality of "spiral" or "offset cylindrical" mating surfaces which engage each other when the retaining ring is mounted on the anchor. It has been found that such an arrangement is self-tightening. That is, if the retaining ring is not fully tightened on the anchor, it will self tighten as a result of normal acceleration and deceleration of the vehicle. Such an arrangement is particularly preferred when the anchor and retaining ring are made out of different materials, e.g. metal and plastic or different plastics. The "fit" of the anchor and retaining ring are affected by the differences in physical properties of the materials, including thermal coefficient of expansion, tensile strength and/or resistance to deformation under load over time (creep). These differences could cause the retaining ring to loosen if not for the self-tightening feature of this arrangement.

It is understood, however, that an arrangement involving "spiral" or "offset cylindrical" surfaces is not required. For example, the side walls of the anchor and retaining ring may be cylindrical and comprise interengaging threads or the like. In such an embodiment, the retaining ring would b screwed onto the anchor just as a conventional jar lid is screwed onto a jar.

It is further understood that the retaining ring may be releasably secured to the anchor by any suitable means. For example, in the embodiment shown in FIGS. 1-5, the retaining ring comprises slots and fits on the anchor which has corresponding ribs. If desired, the retaining ring may comprise ribs which fit into corresponding slots in the anchor. Alternatively, the retaining ring may fit inside the retaining ring in which case the inner surface of the anchor side wall would comprise the slots or ribs and the outer surface of the retaining ring side wall would comprise the corresponding ribs or slots or other interengaging members.

In the embodiment shown, there are a plurality of ornamental lug nuts 64 positioned symmetrically about and extending upwardly from the top wall 52 of the retaining ring 14.

The retaining ring 14 comprises a releasable locking mechanism to prevent the retaining ring 14 from loosening, i.e. rotating counter-clockwise once it has been tightened onto the anchor 12. With reference to FIGS. 4 and 4a, the locking mechanism comprises a pair of opposing generally U-shaped slots 66 and 68 which define a section of the top wall 52 of the retaining ring 14 as a pivot plate 70. The first slot 66 extends around one of the ornamental lug nuts 64. The second slot 68 extends to about the outer periphery of the top wall 52 so that, when mounted on the anchor and tightened, a portion of the pivot plate 70 extends over the serrations 48 of the top surface of the anchor side wall 20.

The bottom surface of the pivot plate 70 directly above the serrations 48 of the anchor side wall 20 comprises corresponding saw tooth serrations 72. In this arrangement, when the retaining ring 14 is rotated clockwise onto the anchor 12, the serrations 48 of the anchor side wall 20 engage the serrations 72 of the pivot plate 70, preventing counter-clockwise rotational movement of the retaining ring 14 relative to the anchor 12. This prevents loosening of the retaining ring 14. Detents 73 are provided to prevent lateral movement of the serrated end of the pivot plate 70 as the retaining ring 14 is tightened onto the anchor.

The slots 66 and 68 are separated by two supporting, flexible bridges 74 which form living hinges. Depression of the lug nut 64 on one side of the pivot plate 70 causes the plate 70 to pivot about the bridges 74, raising the opposite end of the plate 70. This disengages the serrations 72 of the pivot plate from the serrations 48 of the anchor 12 and allows the retaining ring 14 to be rotated counter-clockwise, i.e. unscrewed, for removal from the anchor. A stop 76 limits the downward movement of the lug nut 64 and the radially inward portion of the pivot plate to prevent damage to the bridges 74 which would occur if the lug nut 64 is depressed too far.

The cover 16 is adapted to fit over the retaining ring 14. In the embodiment shown, the cover 16 comprises a cylindrical side wall 78 and a top wall 80 having a raised center portion 82. The inner surface of the side wall 78 comprises a lip 84 which snap into a recess 86 in the outer surface of the retaining ring 14 side wall 44. A land 87 is provided on the retaining ring which limits downward movement of the cover relative to the retaining ring. The land 87 prevents the lip 84 of the cover from overshooting the recess 86.

The cover 16 further comprises openings 88 through which the decorative lug nuts 64 of the retaining ring 14 extend. This allows the locking mechanism of the retaining ring 14 to be disengaged by depressing the appropriate decorative lug nut 64 which extends upwardly from the pivot plate 70 through an opening 88 in the cover. In this arrangement, the cover 16 and retaining ring 14 can be removed as a single unit.

Figure 5:
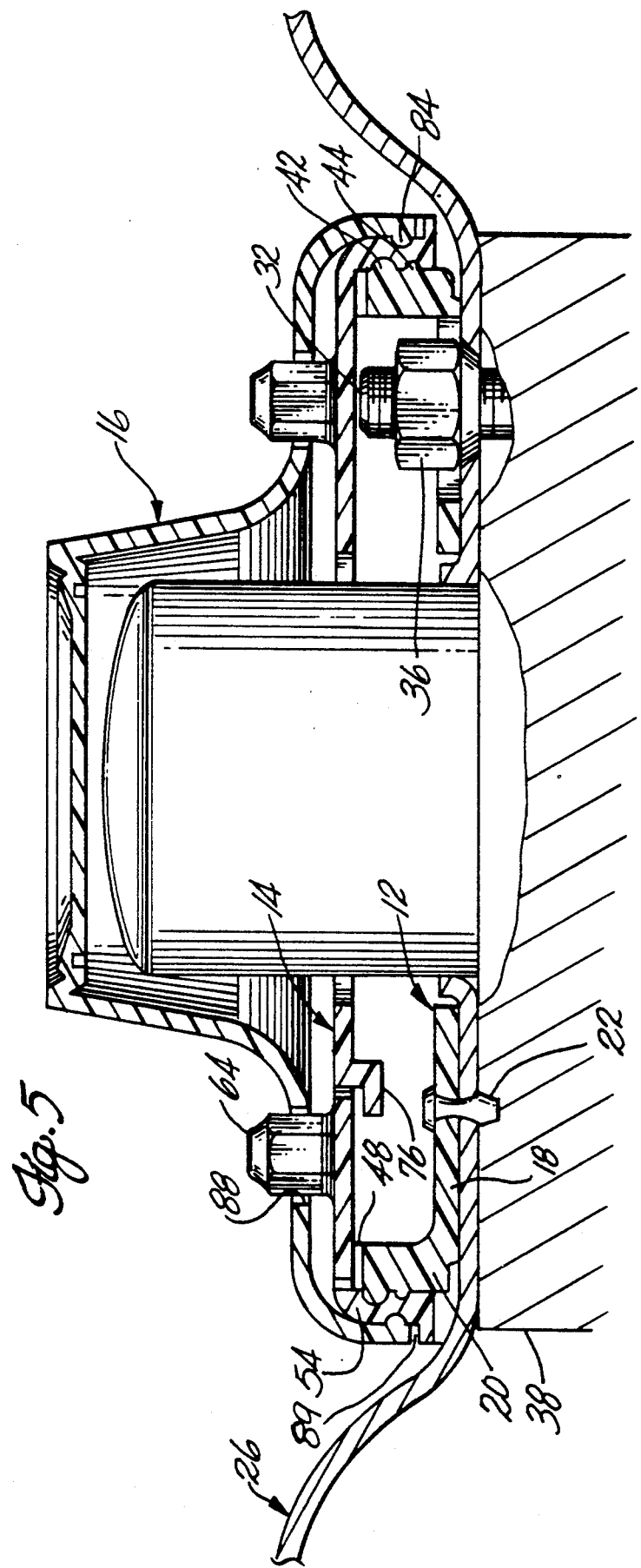
FIG. 5 is a cross sectional view of the hubcap assembly shown in FIGS. 1 and 2.

As shown in FIG. 5, the side wall 54 of the retaining ring 14 is shorter than the side wall 20 of the anchor 12. This provides a small gap 89 between the bottom of the retaining ring side wall 54 and the wheel 26. The purpose of the gap 89 is to allow a person who is unaware of the latch mechanism, or simply forgets, to remove the retaining ring and cover with a conventional crowbar. In this respect, the rounded cross-sections of ribs 42 and 44 and slots 56 and 58 allow the retaining ring and cover to be pried or "popped" off more easily than ribs and slots of square or rectangular cross-section. The increased flexibility in the anchor side wall 20 provided by windows 46 also assists in this regard.

Figure 8:
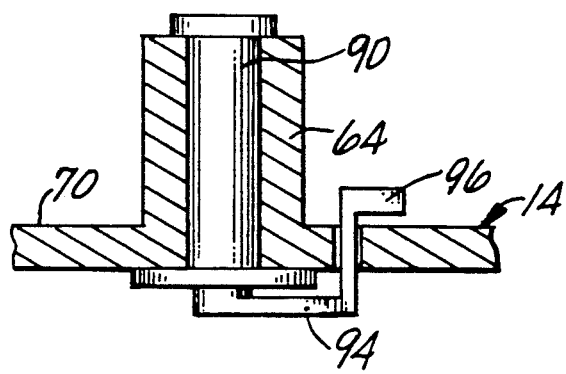
FIG. 8 is a cross-sectional view of a preferred locking mechanism.
Figure 9:
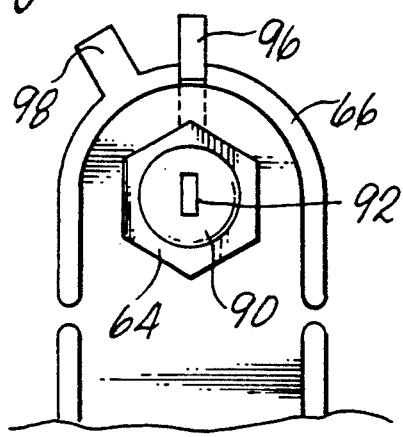
FIG. 9 is a top view of the locking mechanism of FIG. 8.

If desired, there may be provided a locking mechanism to prevent removal of the cover and retaining ring without an unlocking key or the like. FIGS. 8 and 9 show a preferred locking mechanism. The locking mechanism comprises a tumbler 90 of conventional design which is mounted as part of the ornamental lug nut 64 and extends through the pivot plate 70. The upper end of the tumbler 90 comprises a keyhole 92 for receiving an appropriate key. At the bottom of the tumbler 90, there is a locking bar 94 which is rotated between a locked position and an open position by insertion of the key in the keyhole and rotation of the key. The locking bar 94 extends from the bottom of the tumbler, up through slot 66 to form a tab 96. In its locked position, the tab 96 overlies the top wall of the retaining ring 14 and prevents the ornamental lug nut 64 from being depressed. In its open position, the tab 96 overlies a notch 98 in the top wall of the retaining ring 14 which allows the ornamental lug nut 64 to be depressed.

Figure 10:
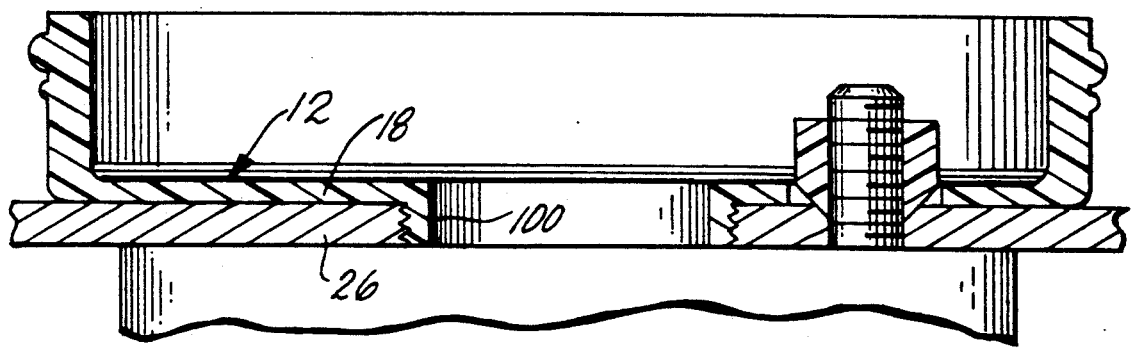
FIG. 10 is a cross-sectional view of another preferred anchor.

It is apparent that many variations in the above described preferred embodiment of the invention may be practiced without departing from the scope of the invention. For example, it is understood that the size and shape of the anchor may vary depending on the size and shape of the wheel as well as the size and shape of the retaining ring and cover. Any means for attaching the anchor to the wheel may be used. For example, depending on the style of the wheel, the anchor base may be screwed onto the wheel. In such an embodiment, as shown in FIG. 10, the anchor 12 comprises a threaded cylindrical flange 100 which extends downwardly about the inner perimeter of the base 18. The flange 100 is sized appropriately to screw into a threaded central opening of a wheel 26.

Figure 11:
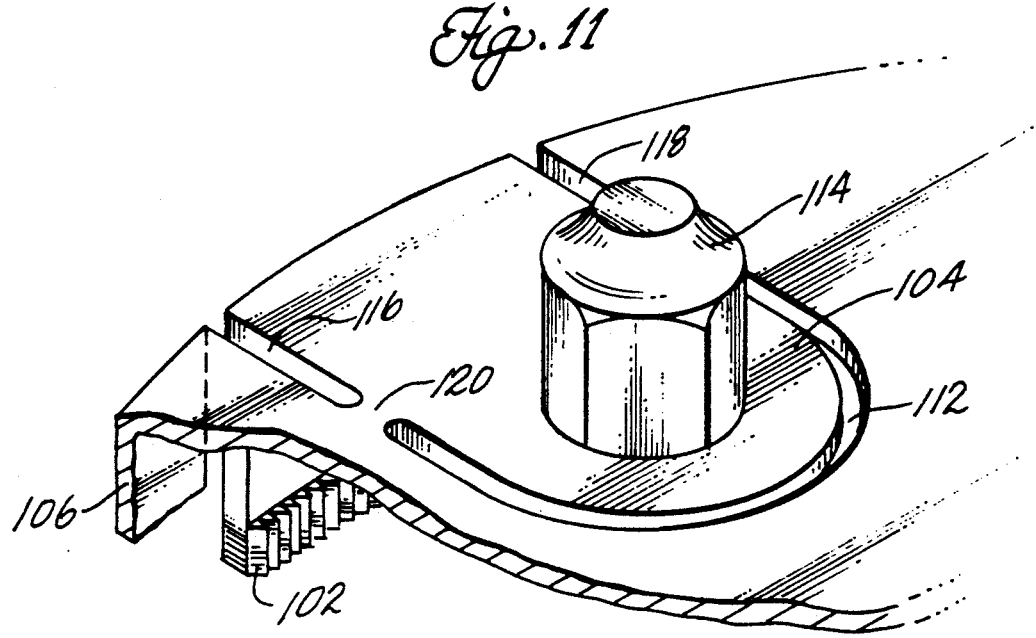
FIG. 11 is a cut-away perspective view of a retaining ring showing an alternative pivot plate arrangement.
Figure 12:
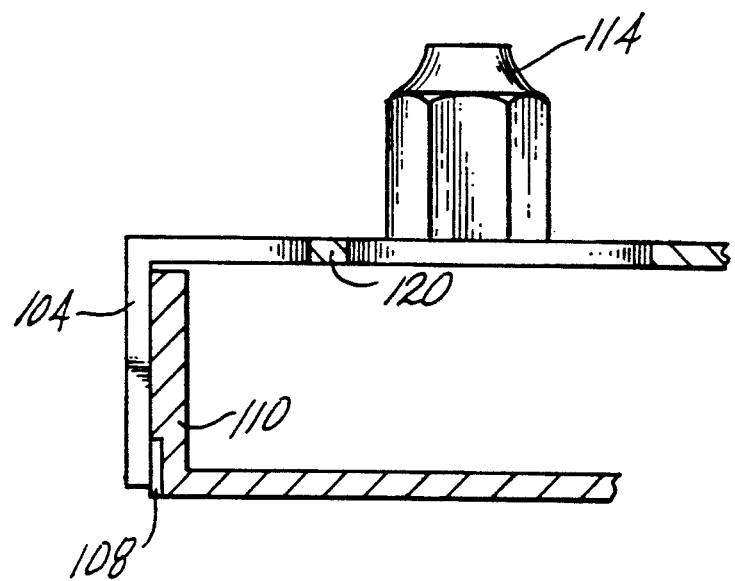
FIG. 12 is a fragmentary cross-sectional view of the retaining ring shown in FIG. 11 mounted on an anchor.

In the preferred embodiment described above, the releasable locking mechanism included interengaging saw-tooth serrations located on the top surface of the anchor side wall and the bottom surface of the retaining ring pivot plate. It is apparent that the location of the serrations may vary as desired. For example, FIGS. 11 and 12 show an embodiment wherein serrations 102 are located on the inner surface of a pivot plate 104 which extends down the retaining ring side wall 106. Corresponding serrations 108 are located on the outer surface of the anchor side wall 110. In this embodiment, the pivot plate 104 is defined by three slots. Slot 112 extends around an ornamental lug nut 114 as in the embodiment described above and is separated from slots 116 and 118 by a pair of bridges 120. Slots 116 and 118 extend from bridges 120 to the bottom of the retaining side wall 106. In this arrangement, depression of the ornamental lug nut 114 causes the side wall portion of the pivot plate 104 to pivot outwardly, releasing the serrations 102 of the pivot plate 104 from the serrations 108 of the anchor side wall 110.

Figure 13:
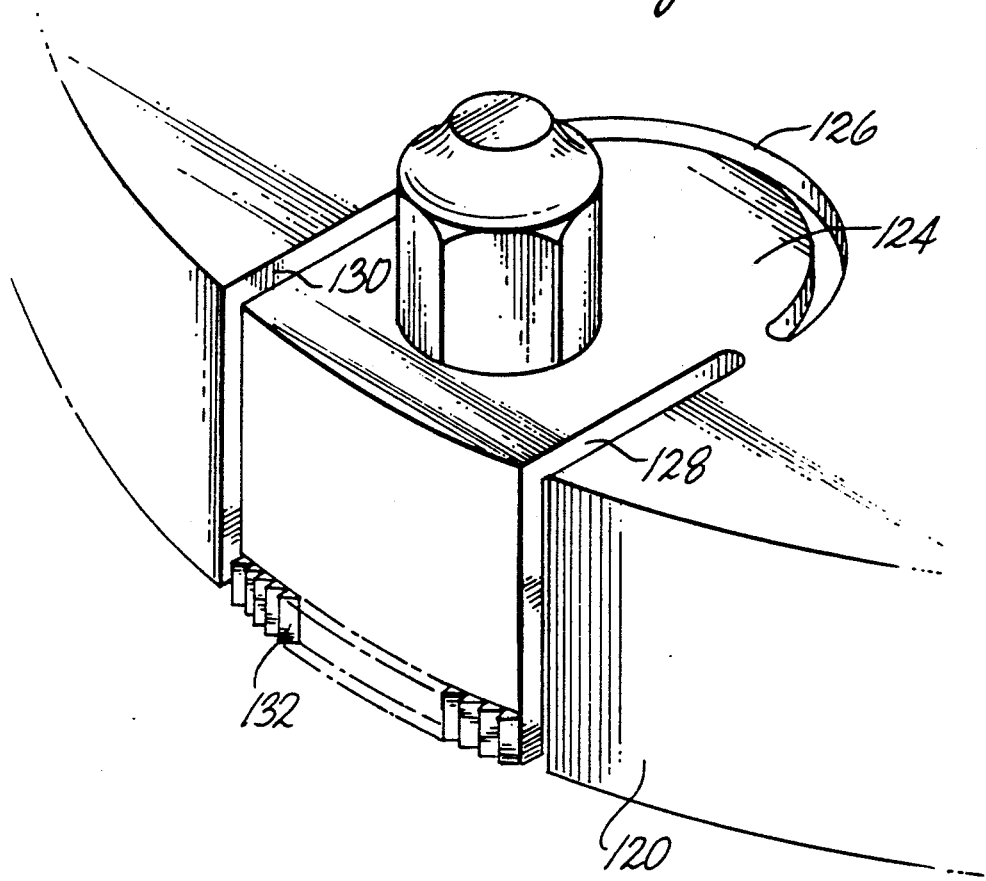
FIG. 13 is a cut-away perspective view of a retaining ring showing yet another alternative pivot plate arrangement.
Figure 14:
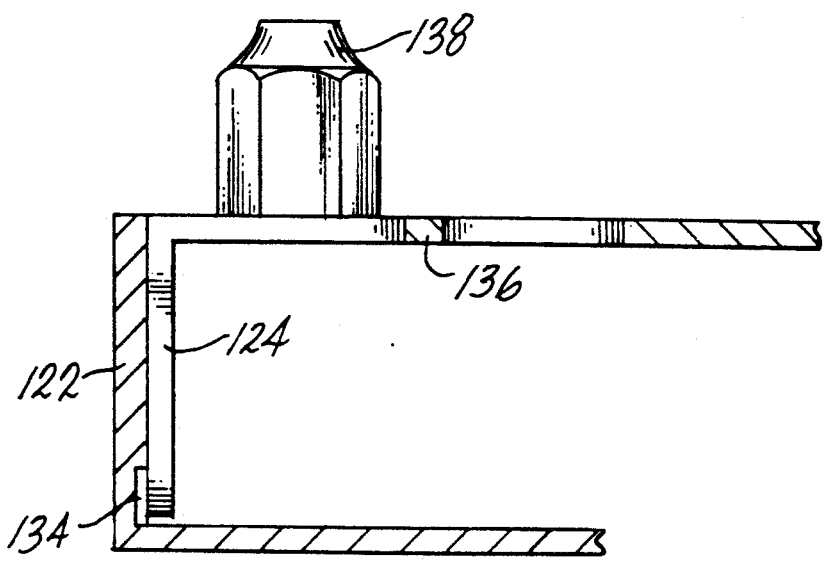
FIG. 14 is a fragmentary cross-sectional view of the retaining ring shown in FIG. 13 mounted on an anchor.

FIGS. 13 and 14 show an embodiment wherein the side wall 120 of the retaining ring fits inside of the anchor side wall 122. In this embodiment, the pivot plate 124 is defined by a U-shaped slot 126 and by slots 128 and 130 which extend down the side wall 120 of the retaining ring. The pivot plate 124 comprises serrations 132 on its outer surface which engage corresponding serrations 134 on the inside surface of the anchor side wall 122. The bridges 136 which form the living hinges of the pivot plate 124 are located closer to the center of the retaining ring than the ornamental lug nut 138. In this arrangement, depression of the ornamental lug nut 138 results in inward movement of the side wall portion of the pivot plate 124, thereby releasing the pivot plate serrations 132 from the serrations 134 of the anchor side wall 122.

It is further understood that the releasable locking mechanism need not involve interengaging serrations. For example, FIG. 15 shows an arrangement involving an interlocking pin 140 and hole 142. If serrations are used, they may be of any suitable configuration in addition to a "saw-tooth" configuration. It is also understood that the releasable locking mechanism may comprise any means for disengaging the saw-tooth serrations or other interengaging means.

While it is presently preferred that the releasable locking mechanism be incorporated into a retaining ring over which the cover fits, the releasable locking means may be incorporated directly into the cover. In such an embodiment, the cover is secured onto or otherwise rotatably engaged directly with the anchor.

In the embodiment shown in FIGS. 1-5, the cover extends over only the central portion of the wheel. It is to be understood that the size and shape of the cover can be varied as desired and may extend to the outer periphery of the wheel if desired.

FIG. 16 shows an embodiment of the invention wherein the cover 150 has a smooth continuous curve and extends to a position near the outer perimeter of the wheel. The cover 150 thus covers a majority of the wheel, not just the central portion as in the embodiments described above. The base 152 of the anchor 154 is contoured to fit the curvature of the wheel 156 and is secured to the wheel by rivets 157 or the like. Rather than an ornamental lug nut which may be depressed to release the latching mechanism, the retaining ring 158 comprises a depressible button 160 which extends upwardly from the end of the pivot plate 162 opposite the serrations 164. The top surface of the button 160 is flush with the top surface of the cover. In this embodiment, the cylindrical side wall 166 of the cover 150 is hidden from view.

It is presently preferred that the entire hubcap assembly be constructed out of plastic, although metal may be used if desired. Presently preferred plastics for use in manufacture of the anchor include 6 or 4-6 nylons, arylon, ABS or the like. Such plastics tend to exhibit sufficient strength and temperature resistance for the application. Nylon and acetate resins are presently preferred materials for use in constructing the retaining ring.

It is presently preferred that the cover be made of a platable plastic to provide a bright chrome finish on the cover. Such plastics include ABS, nylons, polyesters and the like, as are well known in the art. If a colored appearance rather than a chrome-plated appearance is desired, the cover may be made of any suitable color plastic or any plastic which can be painted to provide the desired decorative appearance.

It is to be understood that, depending on the precise requirements for each of the anchor, retaining ring and cover, any suitable plastic may be used.

For the above reasons, the foregoing description should not be read as pertaining only to the precise structures described, but should be read consistent with and as support for the following claims which are to have their fullest fair scope.

What is claimed is:

1. A hubcap assembly comprising;
   an anchor adapted to be fixedly secured to the outer surface of a wheel of an automobile comprising a base and a generally cylindrical side wall extending upwardly around the periphery of the base;

a cover adapted to fit over the anchor comprising a top wall and a cylindrical side wall extending downwardly from the top wall;

means for removably securing the cover to the anchor whereby the cover is removable from the anchor without removing the wheel from the automobile, said means comprising interengaging members on the anchor side wall and cover side wall for rotatably mounting the cover onto the anchor and releasable latch means for releasably preventing loosening rotational movement of the cover relative to the anchor once the cover has been mounted on the anchor.

2. A hubcap assembly as claimed in claim 1 wherein the interengaging means comprises at least one rib on one of the anchor side wall and the cover side wall and at least one slot for receiving said rib(s) in the other of the anchor side wall and cover side wall.

3. A hubcap assembly as claimed in claim 1 wherein the interengaging means comprises interengaging threads on the side walls of the anchor and cover.

4. A hubcap assembly as claimed in claim 1 wherein the rotatably interengaging means comprises a slot located in one of the anchor side wall and cover side wall and a pin extending into the slot, from the other of the anchor side wall and cover side wall.

5. A hubcap assembly comprising:
an anchor adapted to be fixedly secured to the outer surface of a wheel of an automobile comprising a generally annular base and a generally cylindrical side wall, wherein said anchor side wall comprises a plurality of serrations and at least one interengaging member;

a retaining ring adapted to be removably mounted on the anchor having a top wall and a generally cylindrical side wall extending downwardly from the top wall, said retaining ring side wall comprises at least one interengaging member for rotatably interengaging with the interengaging member of the anchor side wall and wherein one of the top wall and side wall of the retaining ring comprises a plurality of serrations which engage the serrations of the anchor side wall when the retaining ring is mounted on the anchor to prevent loosening rotational movement of the retaining ring relative to the anchor and, wherein the retaining ring comprises means for disengaging the serrations of the retaining ring from the serrations of the anchor side wall whereby the retaining ring is removable from the anchor without removal of the wheel from the automobile; and a decorative cover adapted to be mounted over and secured to the retaining ring.

6. A hubcap assembly as claimed in claim 5 wherein the inner diameter of the retaining ring side wall is slightly greater than the outer diameter of the anchor side wall and wherein the interengaging members of the anchor are on the exterior surface of the anchor side wall and the interengaging members of the retaining ring of the interior surface of the retaining ring side wall.

7. A hubcap assembly as claimed in claim 6 further comprising a releasable lock for releasably preventing pivoting movement of the pivot plate from its latched to its unlatched positions.

8. A hubcap assembly as claimed in claim 5 wherein the inner diameter of the retaining ring side wall is slightly smaller than the outer diameter of the anchor side wall and wherein the interengaging members of the anchor are on the interior surface of the anchor side wall and the interengaging members of the retaining ring of the exterior surface of the retaining ring side wall.

9. A hubcap assembly as claimed in claim 5 wherein the interengaging means comprises at least one rib on one of the anchor side wall and the retaining ring side wall and at least one slot for receiving said rib(s) in the other of the anchor side wall and retaining ring side wall.

10. A hubcap assembly as claimed in claim 5 wherein the interengaging means comprises interengaging threads on the side walls of the anchor and retaining ring.

11. A hubcap assembly as claimed in claim 5 wherein the rotatably interengaging means comprises a slot located in one of the anchor side wall and retaining ring side wall and a pin extending into the slot, from the other of the anchor side wall and retaining ring side wall.

12. A hubcap assembly as claimed in claim 5 wherein the interengaging members of the anchor side wall are located on a plurality of spiral or offset cylindrical mating surfaces and the interengaging members of the retaining ring side wall are located on a plurality of corresponding spiral or offset cylindrical mating surfaces and wherein, where the retaining ring is mounted on the anchor and the interengaging members have been rotatably engaged, the mating surfaces of the anchor side wall i.e. in face-to-face engagement with the mating surface of the retaining ring side wall.

13. A hubcap assembly as claimed in claim 5 wherein the retaining ring comprises a pivot plate which is afforded manual resilient pivoting movement about a pivot line between a latched position and an unlatched position, and wherein the serrations of the retaining ring extend from the pivot plate and engage the serrations of the anchor side wall when the pivot plate is in its latched position and whereby manual pivoting movement of the pivot plate to its unlatched position disengages the serrations of the pivot plate from the serrations of the anchor side wall.

14. A hubcap assembly as claimed in claim 13 wherein the serrations of the anchor side wall are located along the top of the side wall.

15. A hubcap assembly as claimed in claim 13 wherein the cover comprises a hole above the pivot plate and the retaining ring comprises an extension which extends upwardly into the cover hole and wherein depression of the extension moves the pivot plate from its latched position to its unlatched position.

16. A hubcap assembly as claimed in claim 15 wherein the extension comprises the appearance of a lug nut.

17. A hubcap assembly as claimed in claim 13 further comprising a stop to limit the pivotal movement of the pivot plate.

18. A hubcap assembly comprising:
an anchor adapted to be fixedly secured to the outer surface of a wheel comprising a generally annular base and a generally cylindrical side wall, wherein said anchor side wall comprises at least one interengaging member on its exterior surface and a plurality of serrations along its top surface;

a retaining ring adapted to be removably mounted on the anchor having a top wall and a generally cylindrical side wall extending downwardly from the top wall, said retaining ring side wall having an inner diameter slightly greater than the outer diameter of the anchor side wall and comprising at least one interengaging member on its interior surface for rotatably interengaging with the interengaging member of the anchor side wall and wherein the top wall comprises a pivot plate which is afforded manual resilient pivoting movement about a pivot line between a latched position and an unlatched position, said pivot plate comprising a plurality of serrations which engage the serrations of the anchor side wall when the retaining ring is mounted on the anchor and the pivot plate is in its latched position to thereby prevent loosening rotational movement of the retaining ring relative to the anchor and whereby manual pivoting movement of the pivot plate to its unlatched position disengages the serrations of the pivot plate from the serrations of the anchor side wall; and a decorative cover adapted to be mounted over and secured to the retaining ring.

19. A hubcap assembly as claimed in claim 18 wherein the interengaging members comprise at least one rib on one of the anchor side wall and the retaining ring side wall and at least one slot for receiving said rib(s) in the other of the anchor side wall and retaining ring side wall.

20. A hubcap assembly as claimed in claim 18 wherein the interengaging members comprise interengaging threads on the side walls of the anchor and retaining ring.

21. A hubcap assembly as claimed in claim 18 wherein the interengaging members comprise a slot located in one of the anchor side wall and retaining ring side wall and a pin extending into the slot, from the other of the anchor side wall and retaining ring side wall.

22. A hubcap assembly as claimed in claim 18 wherein the interengaging members of the anchor side wall are located on a plurality of spiral surfaces and the interengaging members of the retaining ring side wall are located on a plurality of corresponding spiral or offset cylindrical mating surfaces and wherein, where the retaining ring is mounted on the anchor and the interengaging members have been rotatably engaged, the mating surfaces of the anchor side wall are in face-to-face engagement with the mating surface of the retaining ring side wall.

23. A hubcap assembly as claimed in claim 18 wherein the cover comprises a hole above the pivot plate and the retaining ring comprises an extension which extends upwardly into the cover hole and wherein depression of the extension moves the pivot plate from its latched position to its unlatched position.

24. A hubcap assembly as claimed in claim 23 wherein the extension comprises the appearance of a lug nut.

25. A hubcap assembly as claimed in claim 18 further comprising a stop to limit the pivotal movement of the pivot plate after the pivot plate has reached its unlatched position.

26. A hubcap assembly as claimed in claim 18 further comprising a releasable lock for releasably preventing pivoting movement of the pivot plate from its latched to its unlatched positions.

* * * * *

UNITED STATES PATENT AND TRADEMARK OFFICE
CERTIFICATE OF CORRECTION

PATENT NO. : 5,234,260
DATED : August 10, 1993
INVENTOR(S) : Robert L. Coombes, Jr., Terence C. Colwell It is certified that error appears in the above-indentified patent and that said Letters Patent is hereby corrected as shown below:

Column 2, line 39, change "comprise" to -- comprises --.

Column 4, line 35, change "mid point" to -- midpoint --.

Column 5, line 4, change "Stops" to -- stops --.
Column 5, line 16, after "Moreover," delete "that".
Column 5, line 30, change "self tighten" to -- self-tighten --.
Column 5, line 47, before "screwed" change "b" to -- be --.
Column 5, line 67, change "counter-clockwise" to -- counterclockwise --.

Column 6, line 29, change "counter-clockwise" to -- counterclockwise --.
Column 6, line 38, change "which snap" to -- which snaps --.

UNITED STATES PATENT AND TRADEMARK OFFICE
CERTIFICATE OF CORRECTION

PATENT NO. : 5,234,260
DATED : August 10, 1993
INVENTOR(S) : Robert L. Coombes, Jr., Terence C. Colwell It is certified that error appears in the above-indentified patent and that said Letters Patent is hereby corrected as shown below:

Column 9, line 62, change "claim 6" to -- claim 13 --.

Signed and Sealed this

Thirtieth Day of August, 1994

Attest:

BRUCE LEHMAN

Attesting Officer

Commissioner of Patents and Trademarks